Nov. 6, 1962 R. N. SHEPHERD 3,062,486
CONTROL SYSTEM
Filed Nov. 19, 1958 2 Sheets-Sheet 2

INVENTOR.
ROBERT N. SHEPHERD
BY Vernon A. Johnson
ATTORNEY

United States Patent Office 3,062,486
Patented Nov. 6, 1962

3,062,486
CONTROL SYSTEM
Robert N. Shepherd, St. Paul, Minn., assignor to Minneapolis-Honeywell Regulator Company, Minneapolis, Minn., a corporation of Delaware
Filed Nov. 19, 1958, Ser. No. 774,954
17 Claims. (Cl. 244—77)

This invention pertains to automatic control systems for dirigible craft, and, more particularly, to automatic pilots for aircraft wherein a manual control stick is provided for maneuvering said craft.

It is well-known to use a parallel type servo actuator to position an aircraft control surface, such as an elevator, to control the craft about its pitch axis. When such a servo is used, operation of the servo causes movement of the control stick. A problem arises when the control stick signal is directly used to move the craft control surface, and the parallel type actuator is an electrically operated, pecking type servo of the type shown in British Patent 654,041 to Honeywell-Brown Limited. In this case, a rough, jittery feeling is imparted to the control stick, and this roughness is very objectionable to the pilot.

Another problem arises when a force is inadvertently applied to the control stick by the pilot, which closes the control stick switches. This occurs frequently since the pilot normally keeps one hand on the control stick. Since the control surface position for constant attitude varies for different conditions of altitude, airspeed and airplane center of gravity, inadvertent closing of said control stick switches is likely to cause attitude drift in the absence of means to compensate for said varied surface position.

A further problem is encountered when the aircraft is flying at a constant altitude, under the control of an altitude sensing device, and the control stick is operated to change craft altitude. It is necessary to eliminate said altitude control during the altitude change, in order to prevent the altitude signal from opposing the desired change in altitude, and then automatically regain altitude control when the desired new altitude is reached.

Accordingly, it is a primary object of my invention to provide an improved control stick steering system for an aircraft autopilot of the type described, whereby a smooth stick feel is achieved when a command force is applied to the control stick.

A further object is to provide such a system wherein a control stick maneuver causing a change in altitude is effective to render the craft altitude controller inoperative only during the time said altitude is changing.

These and other objects and features of my invention will become apparent upon an examination of the following description thereof, taken in conjunction with the accompanying drawings in which:

FIGURE 1 is a block diagram of my improved control stick steering system for an autopilot, and
FIGURE 2 is a detailed schematic of the system.

General Operation

In FIGURE 1, I have shown my invention adapted to a conventional aircraft autopilot, and more particularly, to the elevator channel thereof. The conventional elevator channel or "Bridge" circuit as it is frequently called, includes signal generators 70, 80, 90 and 100 interconnected in series so as to operate elevator amplifier 10 and servo actuator 11, thereby operating drive-unit 12 and elevator control surface 13. Signal generator 70 is a conventional feedback or servo balance arrangement for generating a signal proportional to displacement of the elevator from the streamlined position. Signal generator 80 is arranged to provide a signal proportional to craft pitch rate, and includes a rate sensing device such as a rate gyro. Signal generator 90 is arranged to provide a signal proportional to craft pitch displacement, and includes a displacement sensing device such as a vertical gyro. Signal generator 100 is a conventional altitude control and generates a signal proportional to altitude change. The algebraic sum of the output signals from these generators is used to control the craft control surface 13 in the conventional manner.

In order to achieve satisfactory manual control of the craft employing this conventional autopilot, I have additionally provided trim and pitch integrators 20 and 30, signal generators 40, 50 and 95, and the associated circuitry as shown in FIGURE 1. Signal generator 40 is arranged to provide a control signal responsive to movement of the craft control stick; signal generator 50 is arranged to provide a control signal responsive to operation of trim integrator 20; and signal generator 95 is arranged to provide a control signal responsive to operation of pitch integrator 30.

The arrangement of FIGURE 1 will be best understood from a general description of the system operation, during various flight conditions and maneuvers. I will first assume that the airplane is being flown manually, with the autopilot disengaged; and I will hereafter refer to autopilot bridge circuit 70–100, which is the above described conventional bridge circuit modified to include signal generator 95. During this assumed flight condition, engage relay contacts 18 are closed as shown, completing a control circuit from the autopilot bridge circuit 70–100 to pitch integrator 30. As the aircraft is maneuvered about the pitch axis, the vertical and pitch rate gyros sense these movements, and signal generators 80 and 90 produce signals corresponding to these aircraft movements. These signals are algebraically added to provide a resultant output signal from autopilot bridge 70–100, this signal being thereby transmitted over contacts 18 to pitch integrator 30. Pitch integrator 30 is thereby operated, causing signal generator 95 to produce a signal that opposes the signals from signal generators 80 and 90 to thereby null autopilot bridge 70–100. Thus, the pitch integrator acts as a syncronizing device, causing autopilot bridge 70–100 to be balanced for any flight condition, thereby eliminating a residual bridge signal and preventing a "bump" when the autopilot is engaged. It should be noted here that the output signals from the autopilot bridge 70–100 are ineffective to operate servo-actuator 11 until the autopilot is engaged, as will be more clearly understood during the explanation of FIGURE 2 below.

When the autopilot is engaged, contact 18 is opened, thereby opening the above described control circuit to pitch integrator 30 and terminating the above mentioned synchronizer operation. Thereafter, assuming that there is no control stick maneuver, pitch integrator 30 and signal generator 95 are held at the conditions existing when the autopilot was engaged. For example, if the autopilot is engaged in level flight, with elevator 13 streamlined, signal generators 70, 80 and 90 all have zero signal output, and therefore, generator 95 also has zero output. However, if the autopilot is engaged when the craft is in a 30 degree climb, and the elevator is streamlined, pitch generator 95 produces a signal proportional to said climb attitude, and this signal is nulled by signal generator 90. The output signal of the generator 95 is then a reference signal, and any tendency of the craft to move from this fixed flight attitude causes the signal from generator 90 to move elevator 13, and thereby restore the craft to said climb attitude.

At the moment that the autopilot is engaged, the pitch integrator potentiometer had been normally positioned so as to generate a signal equal and opposite to the algebraic sum of the signals from signal generators 80 and 90, since signal generator 70 would normally have zero output corresponding to a streamlined elevator 13 and the altitude error is zero. In such case, the signal measured between lead 34 and signal ground would be zero. If, thereafter as a result of fuel consumption and shifting center of gravity, or other change in aircraft dynamics, a "droop" condition occurs, the vertical and pitch rate gyros will sense this condition and cause signals to be generated corresponding thereto. This causes movement of elevator 13 to compensate for the droop condition, and generator 70 produces a signal to balance autopilot bridge 70–100. Since generator 95 remains fixed, while that from generator 90 has changed a resultant signal will appear at lead 34, and this signal is transmitted through transformer 22, 23 to trim integrator 20. Trim integrator 20 is thereby operated, and signal generator 50 is thereby caused to null the secondary control circuit including signal generators 50, 100, 95, 90, 80 and 40. When this circuit, or loop, has been nulled, trim integrator 20 is held at the condition causing this null, and its corresponding signal generator 50 produces a fixed signal. Thereafter, the mere closing of contacts 25, 26 alone due to inadvertent operation of the control stick (see FIGURE 2) causes no operation of pitch integrator 30 since lead 34 and contact 25 are at the same potential, and therefore signal generator 95 is prevented from producing a signal that would unbalance the autopilot bridge circuit. This prevents any slight deviation in attitude known as attitude drift.

When a control stick maneuver is initiated, by operation of control stick 35, control stick pitch relay contacts 24, 25 are opened and contacts 25, 26 are closed, thereby replacing trim integrator transformer 22, 23, with pitch integrator transformer 32, 33 in the above described secondary control loop. Signal generator 50 has nulled said secondary loop, in the manner described above, and there is therefore no residual secondary loop signal to operate pitch integrator 30 when the control stick is initially moved. However, operation of the control stick causes a signal to be produced in signal generator 40 whereby lead 34 and contact 25 have a potential difference thereby unbalancing said secondary control loop, and this unbalance condition causes a signal to be transmitted through transformer 32, 33 to pitch integrator 30. Pitch integrator 30 is then effective to operate signal generator 95 and thereby control the aircraft through the autopilot bridge 70–100. Thereafter, when the maneuver has been completed and the control stick is released, contacts 24, 25 are again closed. Trim integrator 20 and generator 50 then operate to null the secondary control loop in accordance with the existing aircraft trim. This prevents attitude drift when force is inadvertently applied to the control stick, as described above.

Altitude control 100 is a conventional altitude controller that effectively holds the craft at a desired altitude, in spite of down drafts, wind gusts, or other such conditions. In this circuit, I have shown the altitude control in a circuit configuration that permits the control to be operative at all times. This is achieved by providing a novel circuit that renders altitude control ineffective to control the craft when the control stick is operated to change altitude; and when the craft is substantially level in the desired new altitude, the altitude controller automatically regains its control effectiveness.

*Detailed Description*

Figure 2:
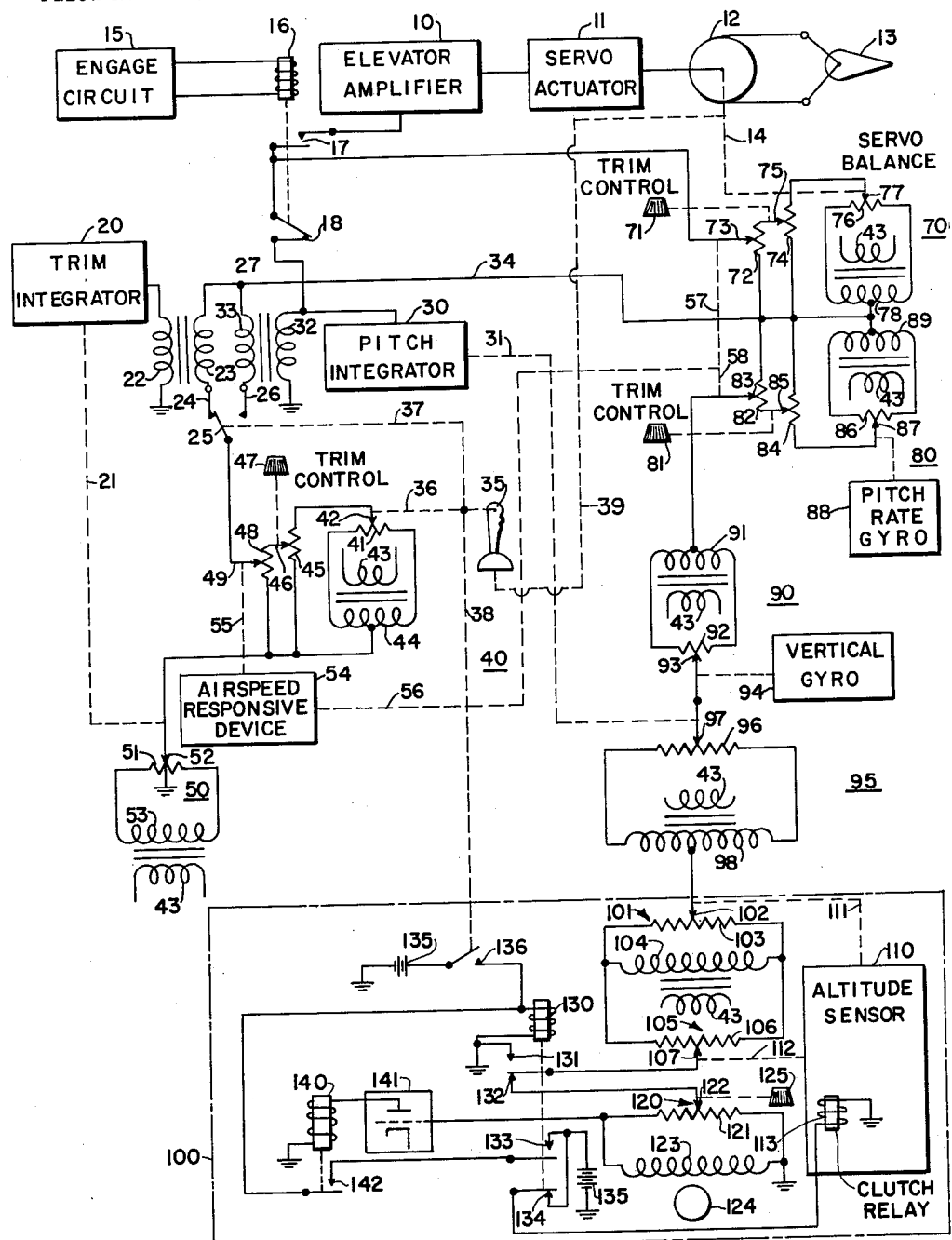

For a more detailed analysis of this autopilot configuration, including my invention, reference is hereby made to FIG. 2, and the following detailed description. During the first part of this description, I will assume that wiper 102 of potentiometer 101 in altitude control 100 is at signal ground potential. This assumption will greatly simplify the description and, as will become apparent, can be made without causing confusion as to overall circuit operation. Thereafter, signal generator 100 will be described under a separate heading Altitude Control.

Figure 1:
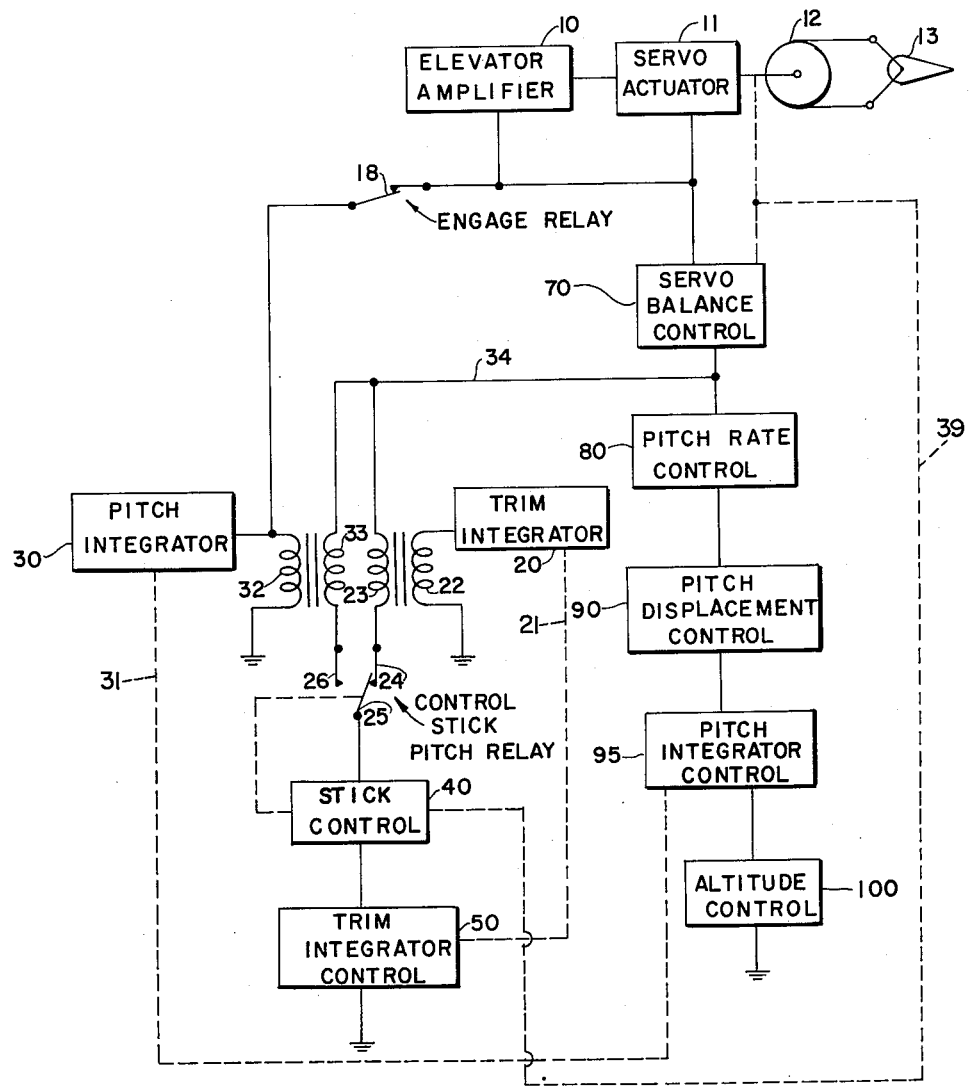

The reference numbers of FIG. 1 have been used to identify equivalent components in FIG. 2. As in FIG. 1, autopilot control bridge 70–100 includes signal generators 70, 80, 90, 95 and 100, these generators being effective when the autopilot is engaged to produce separate signals that are algebraically summed to operate elevator amplifier 10. Elevator amplifier 10 drives servo actuator 11 which in turn operates drive unit, or drum, 12 and thereby moves elevator 13 in response to the autopilot bridge output signal.

In addition to the main autopilot bridge 70–100 just described, a secondary control loop is provided, including trim and pitch integrators 20 and 30, and signal generators 40, 50, 80, 90 and 100. The trim and pitch integrators 20 and 30 are of conventional design, each including an amplifier, a motor and velocity generator, and each provided with a mechanical linkage such as 21, 31 for driving potentiometer wipers such as 52, 97. The structure of these integrators may be similar to that shown in Patent 2,613,352 of Spencer Kellogg, 2nd. Secondary winding 22 of transformer 22, 23 provides the source of input signal for trim integrator 20; and secondary winding 32 of transformer 32, 33 provides one source of signal for operating pitch integrator 30, a second source being provided from autopilot bridge 70–100 through contact 18 of engage relay 16. It should be noted that transformers 22, 23 and 32, 33 are of the high impedance type, so as to isolate autopilot bridge 70–100 from the integrators. The input signal to windings 23 and 33 is determined by the difference of potential between point 27 and contact arm 25 of the control stick pitch relay, this difference of potential being established in the secondary loop circuit including lead 34, the upper portion of resistor 82, wiper 83, secondary winding 91, resistor 92, wiper 93, wiper 97, resistor 96, secondary winding 98, effective ground at wiper 102 as above described, ground at the center tap of resistor 51, wiper 52, the lower portion of resistor 48 and wiper 49. The signal in this secondary loop is applied to either of the primary windings 23 or 33, depending upon whether contacts 24, 25 or contacts 25, 26 are closed. Contacts 24, 25 are normally closed, and contacts 25, 26 are closed by linkage 37 when a force is applied to control stick 35. Control stick 35 is also connected by means of linkage 36 to potentiometer wiper 42, so that operation of the control stick causes a signal to be produced in signal generator 40 in the manner to be described.

Signal generator 40 consists of a potentiometer resistor 41 connected across secondary winding 44 of transformer 43, 44, primary winding 43 being supplied with an alternating voltage. It will be noted that a number of such primary windings are marked 43, indicating that a common primary winding may be used together with a plurality of different secondary windings. Potentiometer wiper 42 is normally positioned at the center of resistor 41, so that there is normally no voltage drop across resistor 45 connected between wiper 42 and the center tap of secondary winding 44. When a force is applied to control stick 35, wiper 42 is moved away from the center position on resistor 41, and a signal is thereby impressed on potentiometer resistor 45 having a magnitude and phase depending upon the length and direction of travel of wiper arm 42 from the center of resistor 41. Potentiometer wiper 46, which is positioned along resistor 45 by means of manual trim control 47, provides a means for manually adjusting the effectiveness of the control stick signal. Potentiometer resistor 48 connected between wiper 46 and the center tap of the secondary winding 44, provides a second voltage dividing network for the signal generated when a force is applied to control stick 35. Potentiometer arm 49 is moved along resistor 48 by air speed responsive device 54 and mechanical linkage 55, thereby varying the effectiveness of the control stick signal with airspeed. Since wiper arm 49 is connected to contact arm 25 of the control-stick-pitch-relay-contacts, and the center tap of secondary winding 44 is connected to wiper 52, the signal appearing across the lower portion of resistor 48 is summed with the signal from signal generator 50 in determining the potential appearing at the lower end of primary windings 23, 33.

Signal generator 50 produces a signal responsive to operation of trim integrator 20. A potentiometer resistor 51 of signal generator 50 is connected across secondary winding 53 of transformer 43, 53, and a potentiometer wiper 52 is arranged to be moved along potentiometer resistor 51 by trim integrator 20 and mechanical linkage 21. A center tap of resistor 51 is connected to signal ground, and since wiper 52 is normally positioned at the center of resistor 51 there is normally no signal output from generator 50. However, when trim integrator 20 is operated responsive to a control signal received in secondary winding 22, wiper 52 is moved along resistor 51, and a signal is produced in generator 50 having phase and magnitude depending on the direction and extent of wiper movement from the resistor center tap. This signal appears between signal ground and wiper 52, and is algebraically summed with the signal appearing on the lower portion of resistor 48 to fix the potential at switch arm 25.

Signal generators 70, 80, 90 and 95 in autopilot control bridge circuit 70–100 are each designed to produce an output signal having phase and magnitude corresponding to the flight condition or other parameter measured. With relay 16 operated, thereby engaging the autopilot, these generators are connected in a series summing arrangement between signal ground and the elevator amplifier input circuit, and the algebraic sum of the output signals from these four generators is therefore effective to control the elevator amplifier, and thereby control the movement of elevator 13.

Signal generator 70 includes a gain control potentiometer 72, 73, potentiometer wiper 73 being connected to the input circuit of elevator amplifier 10. Wiper 73 is moved along potentiometer resistor 72 by air speed responsive device 54, and mechanical linkages 56 and 57. One end of resistor 72 is connected to the center tap of secondary winding 78 of transformer 43, 78; and the other end of potentiometer resistor 72 is connected to potentiometer wiper 75 of potentiometer 74, 75. Potentiometer wiper 75 can be manually adjusted along resistor 74 by trim control 71, so as to vary the authority of the servo balance control. One end of resistor 74 is connected to the center tap of secondary winding 78 of transformer 43, 78, and the other end of resistor 74 is connected to potentiometer wiper 77 of potentiometer 76, 77. Wiper 77 is connected by mechanical linkage 14 to the output of servomotor 11, and is moved along resistor 76 in accordance with the servo motor output. Thus, generator 70 provides the conventional autopilot feedback signal. Resistor 76 is connected across secondary winding 78, and since wiper 77 is normally positioned at the center of resistor 76, there is normally no difference of potential between wiper 77 and the center tap of secondary winding 78, and therefore no output from generator 70. However, when the servomotor is operated, and wiper 77 is moved along resistor 76, an output signal is generated. It is apparent that this output signal is measured between potentiometer wiper 73 and the center tap of secondary winding 78, and that the magnitude of this signal will be automatically varied depending upon the airspeed as indicated by the airspeed responsive device, and manually varied by trim control 71.

Signal generator 80 provides an output signal proportional to the pitch rate of the aircraft, as determined by a pitch rate sensing device such as pitch rate gyro 88. Although a pitch rate gyro is shown, it should be understood that any device suitable for measuring or calculating pitch-rate could be used. Generator 80 includes a transformer 43, 89, a center tap of secondary winding 89 being connected to the center tap of secondary winding 78 of signal generator 70. Potentiometer resistor 86, of potentiometer 86, 87, is connected across secondary winding 89, and wiper 87 is normally positioned at the center of resistor 86 so that there is no difference of potential between the center tap of secondary winding 89 and potentiometer wiper 87. Potentiometer wiper 87 is moved along resistor 86 by pitch rate gyro 88, and the movement of wiper 87 away from the center of resistor 86 causes a difference of potential to exist between the wiper 87 and the center tap of secondary winding 89, thereby providing an output signal corresponding to the pitch rate of the craft. Wiper 87 is connected to one end of potentiometer resistor 84 of potentiometer 84, 85; and the other end of resistor 84 is connected to the center tap of secondary winding 89. Wiper 85 of potentiometer 84, 85 is arranged to be manually adjusted along resistor 84 by trim control 81, thereby providing a manual adjustment on the authority of the pitch rate signal. Wiper 85 is connected to one end of potentiometer resistor 82 of potentiometer 82, 83; and the other end of resistor 82 is connected to the center tap of secondary winding 89. Wiper 83 is arranged to be moved along resistor 82 by air speed responsive device 54 through mechanical linkages 56 and 58, thereby varying the authority of the pitch rate signal in accordance with air speed. It is apparent that the output of signal generator 80 is measured between wiper 83 and the center tap of secondary winding 89, and that the magnitude of this output signal can be varied responsive to air speed and also responsive to a manual trim adjustment.

Signal generator 90 provides an output signal proportional to the displacement of the aircraft from a level flight pitch attitude, this displacement being measured by a device such as vertical gyro 94. Although I have shown a vertical gyro for measuring pitch displacement, it should be understood that any device capable of measuring or calculating pitch displacement could be used for this purpose. Generator 90 includes a transformer 43, 91 the center tap of secondary winding 91 being connected to wiper 83 of signal generator 80. Potentiometer resistor 92 of potentiometer 92, 93 is connected across secondary winding 91. Potentiometer wiper 93 is normally positioned at the center of resistor 92, and there is normally no difference of potential between wiper 93 and center tap of secondary winding 91. However, as the craft is displaced from the level flight attitude, this displacement is sensed by the vertical gyro 94, and the vertical gyro is then effective to move wiper 93 along the resistor 92 to thereby cause a difference of potential between wiper 93 and the center tap of secondary winding 91. This difference of potential is the output signal of generator 90.

Signal generator 95 includes a potentiometer 96, 97, wiper 97 being normally positioned at the center tap position of resistor 96. Resistor 96 is connected across secondary winding 98 of transformer 43, 98, and wiper 97 is moved along resistor 96 by pitch integrator 30 and mechanical linkage 31. The output of signal generator 95, measured between wiper 97 and the above mentioned effective ground potential at wiper 102, has a phase and magnitude corresponding to the direction and extent of displacement of resistor 97 from the center tap position of resistor 96.

Circuit Operation

During the time that the autopilot is not engaged, the various signal generators shown in FIGURE 2 are operative to generate output signals corresponding to craft movements, but these signals are prevented from operating servo actuator 11 since relay 16 is deenergized and contact 17 is open. The autopilot bridge output signal, which is the algebraic sum of the output signals from generators 70, 80, 90 and 95 as mentioned above, and which is measured between wipers 73 in generator 70 and the effective ground at wiper 102 in altitude control 100, is not effective to cause movement of elevator 13. This signal is, however, connected by engage relay contact 18 to secondary winding 32 of transformer 32, 33 and to the input of pitch integrator 30. Pitch integrator 30 is operative responsive to this bridge signal, and, by means of mechanical linkage 31, moves wiper 97 along resistor 96 so as to develop a signal in generator 95 and null autopilot bridge 70–100, thereby causing continuous synchronization of said bridge. Thus, even though the aircraft is maneuvering, and there are signals developed in signal generators such as 80 and 90, the signal from generator 95 is effective to null these signals. The autopilot can therefore be engaged in any pitch attitude, and there is no residual signal in the autopilot bridge to cause a sudden movement of elevator 13, and resultant "bump."

During those times after the autopilot is engaged, when a force is not applied to the control stick, trim integrator 20 is responsive to the difference of potential between point 27 and switch arm 25. The potential at point 27, or lead 34, corresponds to the algebraic sum of the signals from generators 80, 90, and 95; whereas the potential at wiper arm 25 corresponds to the algebraic sum of the signals from generators 40 and 50. When the aircraft is in level pitch attitude flight, all of these generators may be assumed to have zero output, whereby point 27 and arm 25 are both at signal-ground potential and trim integrator does not operate.

Furthermore, during a continuous flight condition, other than level pitch attitude flight, but initiated prior to engagement of the autopilot and with switch 18 closed, signals from generators 80 and 90 are nulled by a signal from pitch control generator 95, consequently trim integrator 20 does not operate. However, after the autopilot has engaged, during which switch 18 is open, and a subsequent "droop" occurs as by craft mistrim due to change in position of the center of gravity, generator 90 provides a signal that is not nulled by generator 95, and thus the portion of the signal from generator 90 not so balanced and in excess of that from generator 95 is thereby effective to operate trim integrator 20. Trim integrator 20 through mechanical linkage 21 drives wiper 52 along resistor 51 so that signal generator 50 provides a signal equal to the excess signal from generator 90. It thereby eliminates the difference of potential between point 27 on lead 34 and switch arm 25.

When control stick 35 is used, linkage 37 is effective to open contacts 24, 25, while closing contacts 25, 26; and linkage 36 is effective to move wiper arm 42 along resistor 41 in accordance with the control stick signal. If the autopilot is not engaged, signals generated in the autopilot are not effective to control elevator surface 13. However, a linkage 39 is provided for causing movement of surface 13 responsive to a force applied to control stick 35. Elevator surface 13 is thereby moved to change the pitch attitude of the craft. The autopilot bridge 70–100 is continually balanced by the above described synchronizing operation of the various signal generators therein.

When the pilot operates the autopilot engage switch (not shown) in engage circuit 15, relay 16 is operated. Contact 18 is thereby opened, and contact 17 is closed, thereby preventing further synchronization of autopilot bridge signals by the pitch integrator 30. The signals in autopilot bridge 70–100 are thereafter effective to control elevator amplifier 10, which is in turn effective to operate servo actuator 11 and thereby move elevator 13. When the autopilot is engaged, and before the control stick is used, trim integrator 20 operates in the same manner as described above, to operate signal generator 50 and thereby cause a signal to be produced that equalizes the potentials at point 27 and switch arm 25. Thus, if the center of gravity of the craft shifts, causing a "droop" condition, signal generator 90 provides a continuous signal that is balanced in autopilot bridge 70–100 by a signal from generator 70 rather than generator 95, causing the potential at point 27 to be different from that at switch arm 25. Trim integrator 20 is then effective to maintain point 27 and switch arm 25 at equal potentials by driving wiper 52 until generator 50 provides a balancing signal. This balancing of potentials is important when a control stick maneuver is initiated, since there is thereby no residual signal in the secondary loop to either oppose or aid the control stick signal that is applied to the pitch integrator when the control stick is used. Furthermore, if a force is inadvertently applied to the control stick, so as to close contacts 25, 26, there is no residaul signal to cause aircraft drift. Equally important is the fact that the trim integrator remains fixed during a control stick maneuver, and when the maneuver has been completed, if the craft has returned to the pre-maneuver attitude, signal generator 50 is in a balanced condition for the existing position of the craft center of gravity. If the craft has been moved to a new attitude, resulting in a different trim condition generator 50 is again operated to compensate for this new condition, in the manner described above. It is important to remember here, that even though there is a difference of potential between the center tap of secondary winding 89 and signal ground due to the attitude of the craft, bridge 70–100 is nulled due to the operation of generator 70. The rebalance action of trim integrator 20 does not affect bridge 70–100, since there is no input to pitch integrator 30.

It should be noted that my method of manually controlling the aircraft through an electrical signal is highly desirable when a parallel type, electric servo-actuator is used. If signal generator 40 were placed in the autopilot bridge rather than between ground and the high impedance windings 23, 33 stated, the pulsing action of the electric servo would produce objectionable jerky action of the control stick and corresponding electrical signal. However, by using the high impedance transformer arrangement and an integrated control stick signal, the integrator effectively filters the signals caused by the jerky stick action and the pulses due to the servo actuator while applied to the control stick are barely perceptible on amplifier 10.

With the autopilot engaged, initiation of a control stick maneuver by movement of control stick 35 causes contacts 25, 26 to be closed, and wiper 42 to be moved along resistor 41. As mentioned above, trim integrator 20 and signal generator 50 have operated to provide an output signal corresponding to the existing position of the craft center of gravity, and the signal from generator 40 is thereby effective to control pitch integrator 30 so as to move the craft about said existing center of gravity. This movement is caused by mechanical linkage 31 which moves wiper 97 along resistor 96 to thereby unbalance the autopilot bridge, this unbalance being effective to move control surface 13 and thereby change the pitch attitude to the craft. As craft attitude changes, generators 80 and 90 provide signals proportional to said change. However, since these signals form part of the input to pitch integrator 30, wiper 97 is moved so as to null the signals from generators 80 and 90 in the same manner as described in the above mentioned pre-engage synchronizing operation. Bridge circuit 70–100 is thereby caused to provide a signal proportional to the control stick signal from generator 40, and independent of the signals from generators 80 and 90.

When the control stick is released, generator 95 provides a signal that is effective to hold the craft in the position at which said release occurred since wiper 97 is prevented from further movement. At that time, the output signal of generator 90 nulls the signal from generator 95. When the balanced condition exists, and assuming that there is no "droop" condition to consider, generators 50, 70, and 80 have no output signals, and elevator 13 is in the streamlined position. If there is an existing "droop" condition when the stick is released, generator 50 produces a signal to null the algebraic sum of the signals from generators 90 and 95 in the secondary control circuit, and generator 70 nulls the algebraic sum of the output signals from generators 90 and 95 in autopilot bridge 70–100.

In FIGURE 2, I have shown the air speed responsive device 54 to vary the authority of generators 40, 70 and 80, this varying of authority being commonly referred to as "scheduling." It should be understood, however, that it may be desirable to schedule various of the signaling devices in accordance with altitude, Mach, or some other aircraft condition or parameter. Such scheduling could be achieved very readily, merely by changing the values of some of the components shown in FIGURE 2. It should also be understood, that although I have shown my invention in connection with the pitch channel of an aircraft control system, that the system could be readily adapted to other aircraft axes, or to another type of dirigible craft.

*Altitude Control*

In the above description, I have simplified the explanation of the system by assuming that wiper 102 in altitude control 100 was grounded. Thus, control 100 had no operative effect on the above detailed description. In actuality, the altitude control is operative at all times, and an on-off switch (not shown) is provided merely to make disengagement possible if there is an altitude control malfunction. However, it will be readily apparent from the following description, that no confusion has been presented by eliminating the discussion of this control until now.

The altitude control that I use in my control system is very similar to that shown by Kutzler in Patent 2,820,-188. The displacement, reset, and rate signal generators shown in said patent, are comparable to the equivalent components shown in simplified form as a portion of control 100 in FIGURE 2. A displacement signal is generated in altitude control 100 when wiper 102 is moved along resistor 103 of potentiometer 101 responsive to operation of linkage 111 and altitude sensor 110; a reset signal is generated when wiper 107 is moved along resistor 106 of potentiometer 105 responsive to operation of linkage 112 and sensor 110; and a rate signal is generated when rotor 124 of the velocity generator 123, 124 is rotated to thereby develop a signal in stator winding 123, all in the manner described in said Kutzler patent.

It should be noted that the signals developed in altitude control 100 are effective to control elevator surface 13, since the displacement and reset signals are developed between wipers 102 and 107, and the altitude rate signals developed across the portion of potentiometer 120 and resistor 121 between wiper 122 and signal ground are connected in series with the other bridge signals so as to be algebraically added thereto. Trim control knob 125 provides means for manually varying the authority of said altitude rate signal.

A controlled altitude is maintained so long as the disengageable clutch (not shown) is engaged, and this condition exists as long as relay 113 in altitude sensor 110 is energized. Contact 134 of relay 130 is normally closed, as shown, and relay 113 is therefore energized so that altitude control 100 is normally effective to maintain a given altitude. However, when it is desired to change altitude, it is necessary to deenergize relay 113 and thereby prevent altitude control 100 from generating a signal in opposition to said change. This is accomplished, automatically, through the combined operation of relays 130 and 140, as will now be described.

When control stick 35 is manually operated to initiate a maneuver of the craft, and signal generator 95 operates responsive to an integrated control stick signal as above described, linkage 38 is effective to close contact 136 and thereby complete an operating circuit for relay 130 including direct current power source 135, which is shown as a battery. Relay 130 operates to close contact 131 and thereby ground wiper 107; to open contact 132 and thereby disconnect the rate of altitude change signal from the autopilot bridge; to close contact 133 and thereby prepare a holding circuit for relay 130; and to open contact 134 and thereby deenergize clutch relay 113. When relay 113 is deenergized, the clutch is disengaged, spring-loaded wiper 102 is moved to the center of resistor 103, wiper 107 becomes fixed at its then existing position on resistor 106, and altitude circuit 100 is rendered ineffective to control craft altitude.

A rate signal is generated by elements 120—125 as the craft changes altitude responsive to said operation of control stick 35. This signal is amplified in switching amplifier 141, and the amplified signal operates switching relay 140. The amplifier 141 is of the type employing several voltage amplification stages in a conventional cascade circuit configuration, but, for simplicity, only one stage is shown and in highly simplified form.

Relay 140 operates responsive to said amplified rate signal, and closes contact 142 to complete a holding circuit for relay 130. This holding circuit prevents relay 130 from becoming deenergized when the pilot releases the control stick during a climb or dive attitude. Thus, once the altitude control is disengaged, it does not re-engage until control stick 35 has been released, and the rate of climb has been reduced to the point where relay 140 becomes deenergized.

It should be noted that an inadvertent change in altitude, due, for example, to a wind gust, will not cause the altitude control to disengage. Although relay 140 operates responsive to the rate signal caused by said gust, relay 130 is not operated since contacts 136 and 133 are open. Thus, although operation of stick 35 is effective to disengage altitude control, termination of said operation will not cause re-engagement of the altitude controller unless rate of altitude change has been reduced to a predetermined level.

Although I have shown what is considered to be the preferred embodiment of my invention, as illustrated and described in detail in the foregoing specification, it is to be expressly understood that the invention is not limited thereto. Various changes may be made in the design and arrangement of the parts without departing from the spirit and scope of the invention as the same will now be understood by those skilled in the art. For a definition of the limits of the present invention, reference will be had primarily to the appended claims.

I claim as my invention:

1. Control apparatus for a dirigible craft having a control surface for steering said craft, comprising: control surface power means; means for reversibly controlling said power means to change the attitude of said craft; a first integrator; first signal generating means operated by said first integrator; a second integrator; second signal generator means operated by said second integrator; manual control means; third signal generating means operated responsive to operation of said manual control means; fourth signal generating means operative responsive to a change in craft attitude to produce a fourth signal proportional to the magnitude and rate of attitude change; fifth signal generating means operated responsive to operation of said power means; a first interconnecting circuit connecting said second, fourth and fifth signal generators to said control means, whereby said power means and control surface are operated responsive to the algebraic sum of said second, fourth and fifth signals; a second interconnecting circuit connecting said first, second, third and fourth signal generators to said first integrator whereby said first integrator is operated responsive to the algebraic sum of said first, second, third and fourth signals to thereby cause said first signal to null said second, third and fourth signals; and means operated responsive to operation of said manual control means for connecting said second integrator to said second interconnecting circuit in place of said first integrator, said null condition in said second interconnecting circuit being effective to prevent operation of said second integrator when said last means is initially operated.

2. Control apparatus for a dirigible craft having a control surface for steering said craft, comprising: control surface power means for reversibly controlling said control surface to steer said craft, and thereby change craft attitude; first integrating means; first signal generating means for producing a first control signal responsive to operation of said integrating means; second signal generating means operative responsive to a change in craft attitude to generate a second control signal proportional to the magnitude and rate of attitude change; third signal generating means for producing a third control signal responsive to operation of said power means; a first interconnecting circuit for operating said power means responsive to the algebraic sum of said first, second and third signals; manual control means; fourth signal generating means for producing a fourth control signal responsive to operation of said manual control means; second integrating means; fifth signal generating means for producing a fifth control signal responsive to operation of said second integrating means; a second interconnecting circuit for operating said second integrating means responsive to the algebraic sum of said first, second, fourth and fifth signals, whereby said fifth signal generator is operated to null the signals in said second interconnecting circuit; and means responsive to operation of said manual control means for connecting said first integrating means in said second interconnecting circuit in place of said second integrating means, whereafter said fourth control signal changes said null condition and operates said first integrator, said first signal generator being thereby operated to change the algebraic sum of signals in said first circuit and thereby steer said craft.

3. Control apparatus for a dirigible craft having a control surface for steering said craft as claimed in claim 2, additionally comprising: a third interconnecting circuit for operating said first integrating means responsive to the algebraic sum of said first, second and third signals; and means for preventing said first and third circuits from being simultaneously completed, completion of said third circuit being effective to cause operation of said first integrating means, whereby said first signal generator operates to null the signals in said first circuit.

4. Control apparatus for a dirigible craft having a control surface for steering said craft, comprising: control means for reversibly controlling said control surface to change the attitude of said craft; a first integrator; first signal generating means operated by said first integrator; a second integrator; second signal generating means operated by said second integrator; manual control means; third signal generating means for producing a third signal responsive to operation of said manual control means; first circuit means connecting said second signal generator to said control means, whereby said control surface is operated responsive to said second signal; second circuit means for operating said first integrator responsive to the algebraic sum of said first, second, and third signals, whereby said first signal is caused to null said second and third signals; and means operated responsive to operation of said manual control means for connecting said second integrator to said second circuit means in place of said first integrator, said null condition in said second circuit being effective to prevent operation of said second integrator and second signal generator when said last means is initially operated.

5. Control apparatus for a dirigible craft having a control surface for steering said craft, comprising: control means for reversibly controlling said control surface to change the attitude of said craft; a first integrator; first signal generating means operated by said first integrator; a second integrator; second signal generating means operated by said second integrator; third signal generating means operative responsive to a change in craft attitude to generate a third signal proportional to the magnitude and rate of attitude change; first circuit means connecting said second signal generator to said control means, whereby said control surface is operated responsive to said second signal; second circuit means for operating said first integrator responsive to the algebraic sum of said first, second and third signals, whereby said first signal is caused to null said second and third signals; manual control means; and means operated responsive to operation of said manual control means for connecting said second integrator to said second circuit means in place of said first integrator, said null condition in said second circuit being effective to prevent operation of said second integrator when said last means is initially operated.

6. Control apparatus for a dirigible craft having a control surface for steering said craft, comprising: control means for reversibly controlling said control surface to change the attitude of said craft; integrating means; first signal generating means operated by said integrating means; second signal generating means operative responsive to a change in craft attitude to generate a second signal proportional to the magnitude and rate of attitude change; third signal generating means operated responsive to operation of said power means for generating a third signal; first circuit means for operating said integrating means responsive to the algebraic sum of said first, second and third signals, thereby causing said first signal to null the algebraic sum of said second and third signals; means for connecting said control means to said first circuit means in place of said integrating means, said balance condition in said first circuit being effective to prevent actuation of said control surface when said last means is initially operated; manual control means; fourth signal generating means for producing a fourth signal responsive to operation of said manual control means; and second circuit means for operating said integrating means responsive to said fourth signal, said first signal generator being thereby operated to change the algebraic sum of signals in said first circuit and thereby steer said craft.

7. Control apparatus for a dirigible craft having a control surface for steering said craft, comprising: control surface power means for reversibly controlling said control surface to steer said craft, and thereby change craft attitude; first signal generating means operative responsive to a change in craft attitude to produce a first signal proportional to the magnitude and rate of attitude change; second signal generating means; first circuit means connecting said generators to said power means, whereby said power means is operated responsive to the algebraic sum of said first and second signals; integrating means operatively connected to said second signal generator; second circuit means connecting said generators to said integrating means, whereby said second signal generating means is operated responsive to the integrated algebraic sum of said first and second signals; manual control means; third signal generating means for producing a third signal responsive to operation of said manual control means; and third circuit means for operating said integrating means responsive to said third signal to thereby operate said second signal generator, said power means being thereby operated to steer said craft responsive to said operation of said manual control means.

8. Control apparatus for a dirigible craft as claimed in claim 7, additionally comprising: means for causing only one of said first and second circuits to be effective at any time.

9. Control apparatus for a dirigible craft having a control surface for steering said craft, comprising: control means for reversibly controlling said control surface to change the attitude of said craft; integrating means; first signal generating means operated by said integrating means; second signal generating means operative responsive to a change in craft attitude to generate a second signal proportional to the magnitude and rate of attitude change; third signal generating means operated responsive to operation of said power means; first interconnecting circuit means for operating said integrating means responsive to the algebraic sum of said first, second and third signals, thereby causing said first signal to null the algebraic sum of said second and third signals; means for connecting said control means to said first circuit means in place of said integrating means, said balance condition in said first circuit being effective to prevent actuation of said control surface when said last means is initially operated; manual control means; fourth signal generating means operated responsive to operation of said manual control means; second integrating means; fifth signal generating means operated responsive to operation of said second integrating means; second interconnecting circuit means for operating said second integrating means responsive to the algebraic sum of said first, second, fourth and fifth signals, thereby causing said fifth signal to null the algebraic sum of said first, second and fourth signals; and means operated responsive to operation of said manual control means for connecting said first integrating means to said second circuit means in place of said second integrating means, said fourth signal generator being thereby operated to unbalance said second circuit, whereupon said first signal generator is operated to change the algebraic sum of signals in said first circuit to steer said craft.

10. Control apparatus for a dirigible craft having a control surface for steering said craft, comprising: control means for reversibly controlling said control surface to change the attitude of said craft; altitude control means for generating a signal proportional to the magnitude and rate of altitude change from a predetermined altitude; circuit means for operating said control means responsive to said signal to thereby hold said craft at said predetermined altitude; means for disengaging said altitude control means to thereby terminate said signal; manual control means, second signal generating means connected to said control means and operative responsive to operation of said manual control means to generate a second signal and thereby steer said craft and cause a change in said craft altitude; means responsive to operation of said manual control means for operating said disengage means; and means including said last mentioned means for holding said disengage means operated until said rate of altitude change signal has been reduced to a predetermined value and said manual control has been terminated, at which time said altitude control is automatically reengaged to hold said craft at said changed craft altitude.

11. Control apparatus for the pitch axis of an aircraft having a control surface for steering said craft, comprising: control means for reversibly controlling said control surface to change the attitude and altitude of said craft; first signal generator means operative responsive to a change in craft altitude; a first pitch signal proportional to the magnitude and rate of altitude change; first integrating means; second signal generating means operated by said first integrating means; third signal generating means operative responsive to a change in pitch attitude to generate a third signal proportional to the magnitude and rate of pitch attitude change; fourth signal generating means operated responsive to operation of said control means; first circuit means for operating said first integrating means responsive to the algebraic sum of said signals, whereby said second signal is caused to null said first, third and fourth signals; means for connecting said control means to said first circuit in place of said first integrating means, said null condition in said first circuit being effective to prevent actuation of said control surface when said last means is initially operated; second integrating means; fifth signal generating means operated by said second integrating means; manual control means; sixth signal generating means for producing a sixth signal responsive to operation of said manual control means; second circuit means, effective when said manual control means is in a non-operated position, to operate said second integrating means responsive to the algebraic sum of said first, second, third, fifth and sixth signals, whereby said fifth signal is caused to null said first, second, third and sixth signals; means operated responsive to operation of said manual control means for connecting said first integrating means to said second circuit means in place of said second integrating means, said null condition in said second circuit being effective to prevent operation of said first integrating means when said last means is initially operated; means operated responsive to operation of said manual control means for rendering said first signal generator ineffective to control the balance of potential in said first and second circuits; and means for restoring the effectiveness of said first signal generator responsive to the release of said manual control means and reduction of said altitude rate portion of said first signal to a predetermined level.

12. Control apparatus for the pitch axis of an aircraft as claimed in claim 11 additionally comprising: airspeed responsive control means; and means operated by said last mentioned means for varying the effectiveness of certain of said signal generators according to craft airspeed.

13. In condition control apparatus having a servomotor operated condition changing means the servomotor altering the condition through its operation effected at least in part by a pulsing action to provide step-like change in its output to the condition changing means, in combination: a balanceable control network operating said servomotor; a condition sensing device providing a first signal providing means unbalancing said network; a servomotor operated device providing a second signal to said network; a first integrator controlled by said network and providing a third signal thereto nulling said network prior to controlling said condition by said servomotor; a manual controller connected in parallel with said servomotor so as to operate therewith and thus operated thereby; additional signal providing means connected to the manual controller an developing a foruth signal upon application of manual force to said controller; a second integrator controlled by said first and third signal providing a fifth signal opposing said first and third signals; selective means for alternatively controlling said first integrator to modify said third signal from said fourth and fifth signal providing means; when operation of the second integrator by said first and third signals is discontinued.

14. The apparatus of claim 13, characterized by the alternative control of said first integrator being affected by force on the manual controller.

15. The apparatus of claim 13, and means controlling said servomotor from said first, second, and third signals while controlling said second integrator from said first and third and fifth signals.

16. In a motor control apparatus having a servomotor, in combination: control means comprising a balanceable control network operating said servomotor; means providing a first signal for unbalancing said network; means providing a second signal affecting the balance of said network; a first motor controlled by said network and providing a third signal thereto nulling said network prior to controlling said servomotor by said network; a fourth signal providing means developing a fourth signal; a second motor means controlled by said first and third signals providing a fifth signal opposing the algebraic sum of said first and third signals whereby said fifth signal is the difference of said first and third signals; and further means removing control of said first motor means by said second signal and additionally controlling said first motor means from said fourth signal and from the additional or fifth signal.

17. Control apparatus for a dirigible craft having a control surface and control surface power means operating in pulses for steering said craft, comprising: signal responsive control means reversibly operating said power means to change the attitude of said craft; motor means; first signal generating means operated by said motor means; manually operable control stick means connected in parallel to the power means and thus positioned by said power means upon operation thereof; second signal generating means for generating a second signal responsive to manually applied force to the manual control stick means while the stick is thus connected in parallel to the power means; first circuit means connecting said first signal generator to said control means, whereby said power means and control surface are operated responsive to said first signal; and a second circuit means connecting said second signal generator and the first signal generator to control said motor means only upon application of manual force to said control stick means, whereby said first signal is caused to be proportional to the second signal while said motor means is substantially nonresponsive to such second signals caused by pulsing operation of the power means.

References Cited in the file of this patent
UNITED STATES PATENTS

| | | |
|---|---|---|
| 2,861,756 | Feucht et al. | Nov. 25, 1958 |
| 2,936,135 | Zupanick et al. | May 10, 1960 |
| 2,945,647 | Bell | July 19, 1960 |